US009083072B2

(12) United States Patent
Conrad et al.

(10) Patent No.: US 9,083,072 B2
(45) Date of Patent: Jul. 14, 2015

(54) ANTENNA MOUNT FOR SELECTIVELY ADJUSTING THE AZIMUTH, ELEVATION, AND SKEW ALIGNMENTS OF AN ANTENNA

(71) Applicant: Winegard Company, Burlington, IA (US)

(72) Inventors: Timothy John Conrad, Mt. Pleasant, IA (US); Joshua Richard Gallerick, Mt. Pleasant, IA (US)

(73) Assignee: Winegard Company, Burlington, IA (US)

( * ) Notice: Subject to any disclaimer, the term of this patent is extended or adjusted under 35 U.S.C. 154(b) by 143 days.

(21) Appl. No.: 14/011,440

(22) Filed: Aug. 27, 2013

(65) Prior Publication Data

US 2015/0059500 A1 Mar. 5, 2015

(51) Int. Cl.
*H01Q 1/12* (2006.01)
*H01Q 3/08* (2006.01)
*F16H 25/20* (2006.01)

(52) U.S. Cl.
CPC ........... *H01Q 1/125* (2013.01); *F16H 25/2015* (2013.01); *H01Q 1/1242* (2013.01); *H01Q 3/08* (2013.01)

(58) Field of Classification Search
CPC ....... H01Q 1/125; H01Q 1/1242; H01Q 3/08; F16H 25/2015; F16H 2025/2028
See application file for complete search history.

(56) References Cited

U.S. PATENT DOCUMENTS

| | | | | |
|---|---|---|---|---|
| 4,663,635 | A * | 5/1987 | Wu | 343/765 |
| 4,672,385 | A * | 6/1987 | Prindle | 343/766 |
| 5,245,351 | A * | 9/1993 | Chou | 343/766 |
| 5,281,975 | A * | 1/1994 | Hugo | 343/766 |
| 5,296,862 | A | 3/1994 | Rodeffer | |
| 5,471,219 | A | 11/1995 | Rodeffer | |
| 6,023,247 | A | 2/2000 | Rodeffer | |
| 6,188,300 | B1 | 2/2001 | Rodeffer | |
| 2007/0066233 | A1 | 3/2007 | Smith | |
| 2010/0238083 | A1 * | 9/2010 | Malasani | 343/765 |
| 2012/0021690 | A1 | 1/2012 | Smith | |

* cited by examiner

*Primary Examiner* — Robert Karacsony
(74) *Attorney, Agent, or Firm* — W. Scott Carson

(57) ABSTRACT

An antenna mount for adjusting the azimuth, elevation, and/or skew alignments of an antenna. The mount has a basic gearbox drive including a worm gear and worm wheel with interchangeable arcuate members that can be inserted in the basic drive design to customize it for azimuth, elevation, and/or skew adjustments. The arcuate member for azimuth adjustments permits the gearbox drive to rotate the attached antenna more than 360 degrees and provides two hard stop positions about 400 degrees from each other for reference points for the search routine and to prevent undue twisting of any attached, exterior wiring. Replacing the azimuth arcuate member with a modified or second arcuate member reduces the rotational movement (e.g., to 20 degrees) making the gearbox drive more suitable for elevation adjustments. Similarly, a third gearbox drive can be provided with a third arcuate member with more of a middle range of movement (e.g., 90-180 degrees) suitable for skew adjustments of the antenna.

22 Claims, 18 Drawing Sheets

ANTENNA MOUNT FOR SELECTIVELY ADJUSTING THE AZIMUTH, ELEVATION, AND SKEW ALIGNMENTS OF AN ANTENNA

BACKGROUND OF THE INVENTION

1. Field of the Invention

This invention relates to the field of antenna mounts and more particularly to the field of such mounts for selectively adjusting the azimuth, elevation, and skew alignments of the antenna.

2. Discussion of the Background

Antenna mounts to selectively adjust the azimuth, elevation, and skew alignments of an antenna can often be very complicated, particularly to manufacture and install. Ones that are complicated to manufacture are usually also relatively expensive to make and assemble. Others that are somewhat difficult to install can present multiple problems. To the extent their designs are complicated, the installer may have to follow detailed, written instructions taking undue amounts of time and possibly resulting in time consuming errors that need to be corrected before the installation is complete. Additionally, the installer is typically on a slanted or flat roof or other exterior location exposed to the elements and his or her safety and time may be compromised by any involved procedures that need to be followed to properly set up the antenna for use.

With this and other problems in mind, the present invention was developed. In it, a basic gearbox design is presented which can be easily and quickly changed by removing and replacing one piece to customize the mount to any number of desired azimuth, elevation, and/or skew adjustments. The basic gearbox design is relatively simple to manufacture, assemble, and install and with the substitution of the single piece in the basic design, it can be made to accommodate a wide variety of desired azimuth, elevation, and/or skew adjustments. In this manner, the overall cost of the antenna mount is greatly reduced without sacrificing its overall functionality and reliability. It is also very easy and quick to install and maintain.

SUMMARY OF THE INVENTION

This invention involves an antenna mount for adjusting the azimuth, elevation, and/or skew alignments of an antenna. The mount can be easily and quickly secured to a post or other support by bolts or other arrangements. The mount has a basic gearbox drive including a worm gear and worm wheel. Interchangeable arcuate members can then be inserted in the basic drive design to customize it for azimuth, elevation, and/or skew adjustments in which the desired ranges of movement or rotation may vary. As for example, the arcuate member primarily designed for azimuth adjustments permits the gearbox drive to rotate the attached antenna more than 360 degrees about a vertical axis. This allows for an efficient and effective search or sweep routine to be performed by a controller as well as subsequent fine tuning of the antenna alignment with one or more signals. In doing so, the azimuth drive with this first arcuate member provides two hard stop positions about 400 degrees from each other to provide reference points for the search routine. The hard stops also prevent undue twisting of any exterior wiring that may be attached to the antenna mount.

Replacing the first arcuate member for the azimuth drive with a modified or second arcuate member can easily and quickly reduce the rotational movement or angle about the vertical axis to as little as 20 degrees or fewer should a special situation call for such a limited azimuth range. However, such a reduced range is usually more suited for elevation adjustments. This is particularly the case in a compact arrangement in which physical restraints may not permit wider movement of the antenna (e.g., dish antenna) without having it strike other parts of the mount or adjacent structures. Should the antenna mount be used for both azimuth and elevation adjustments, two gearbox drives can be used with one having the arcuate azimuth member and the other having the arcuate elevation member. In doing so, the same basic gearbox design is used with simply different arcuate members in it. The drives are then supported to respectively rotate the antenna about vertical and horizontal axes to adjust the azimuth and elevation alignments. Similarly, a third gearbox drive can be provided with a third arcuate member that permits more of a middle range of movement (e.g., 90-180 degrees) that would be more suitable for skew adjustments of the antenna. The various gearbox drives with the interchangeable arcuate members can be used alone or in combinations with one or more of the other drives. In all cases as mentioned above, the same basic gearbox drive can be used thereby decreasing the cost and complexity of manufacture and assembly of the antenna mount and facilitating the installation, operation, and maintenance of it.

DETAILED DESCRIPTION OF THE INVENTION

Figure 1:
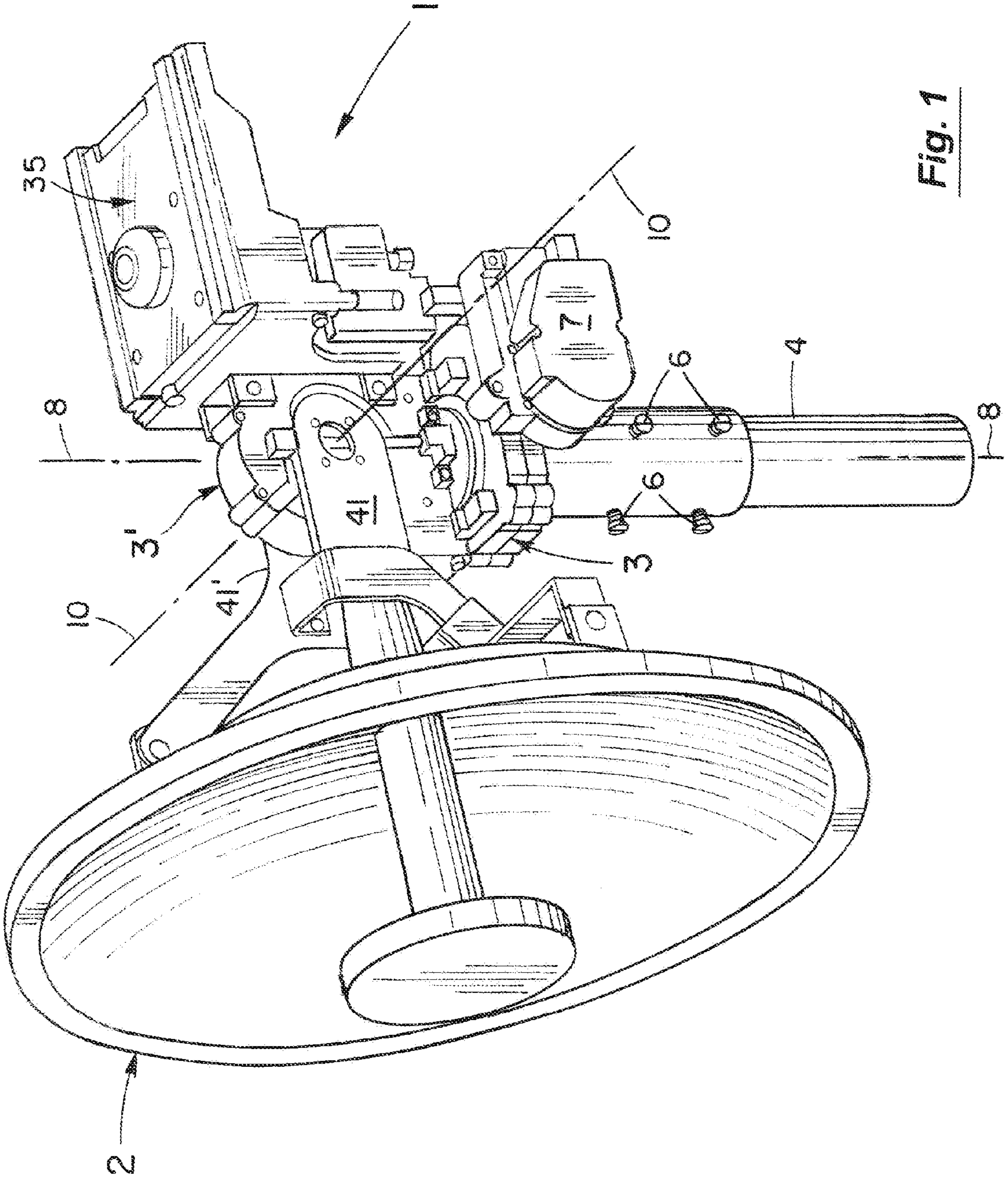
FIG. 1 is a perspective view of the antenna mount of the present invention.
Figure 2:
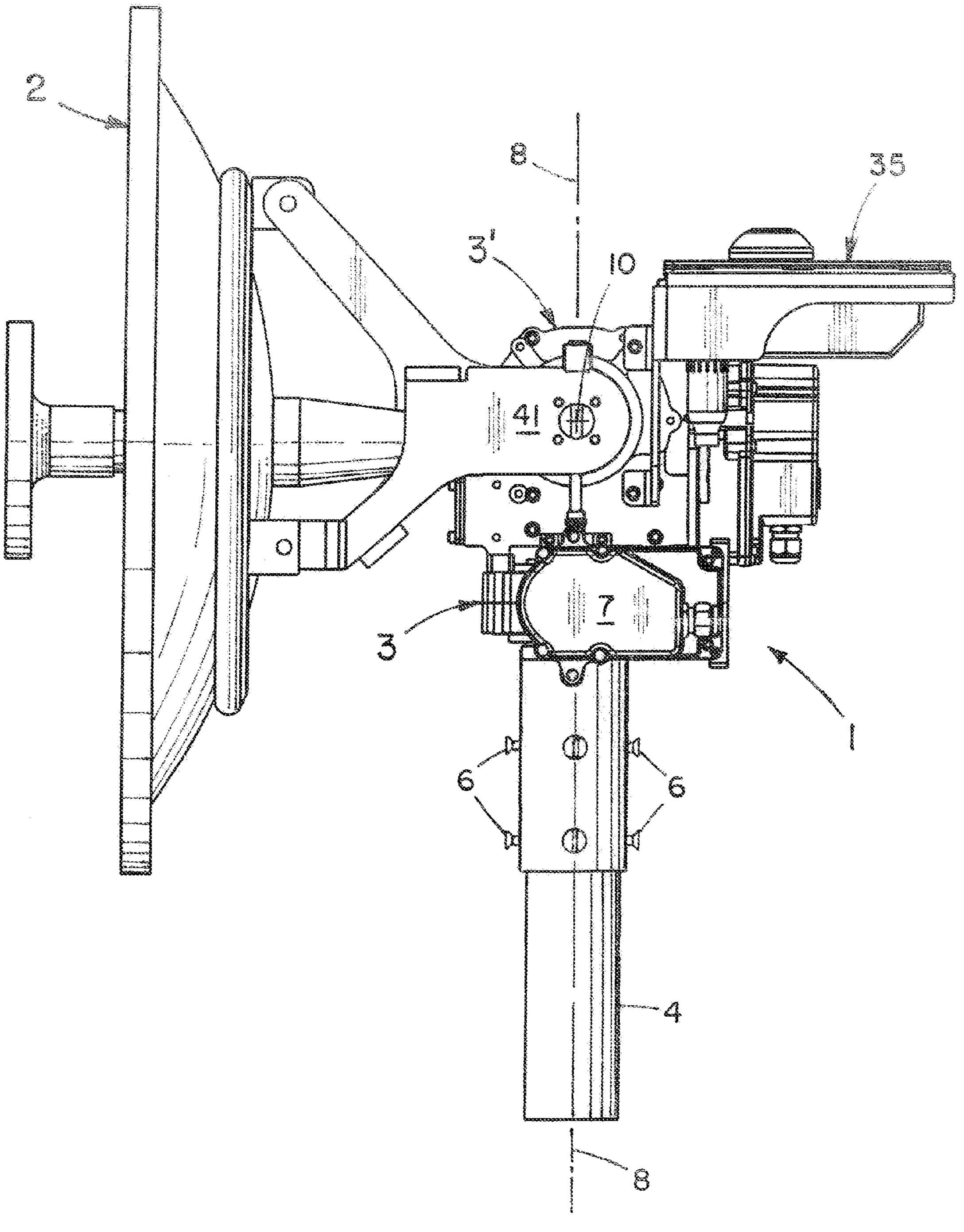
FIG. 2-6 are orthogonal views of the antenna mount of FIG. 1.
Figure 3:
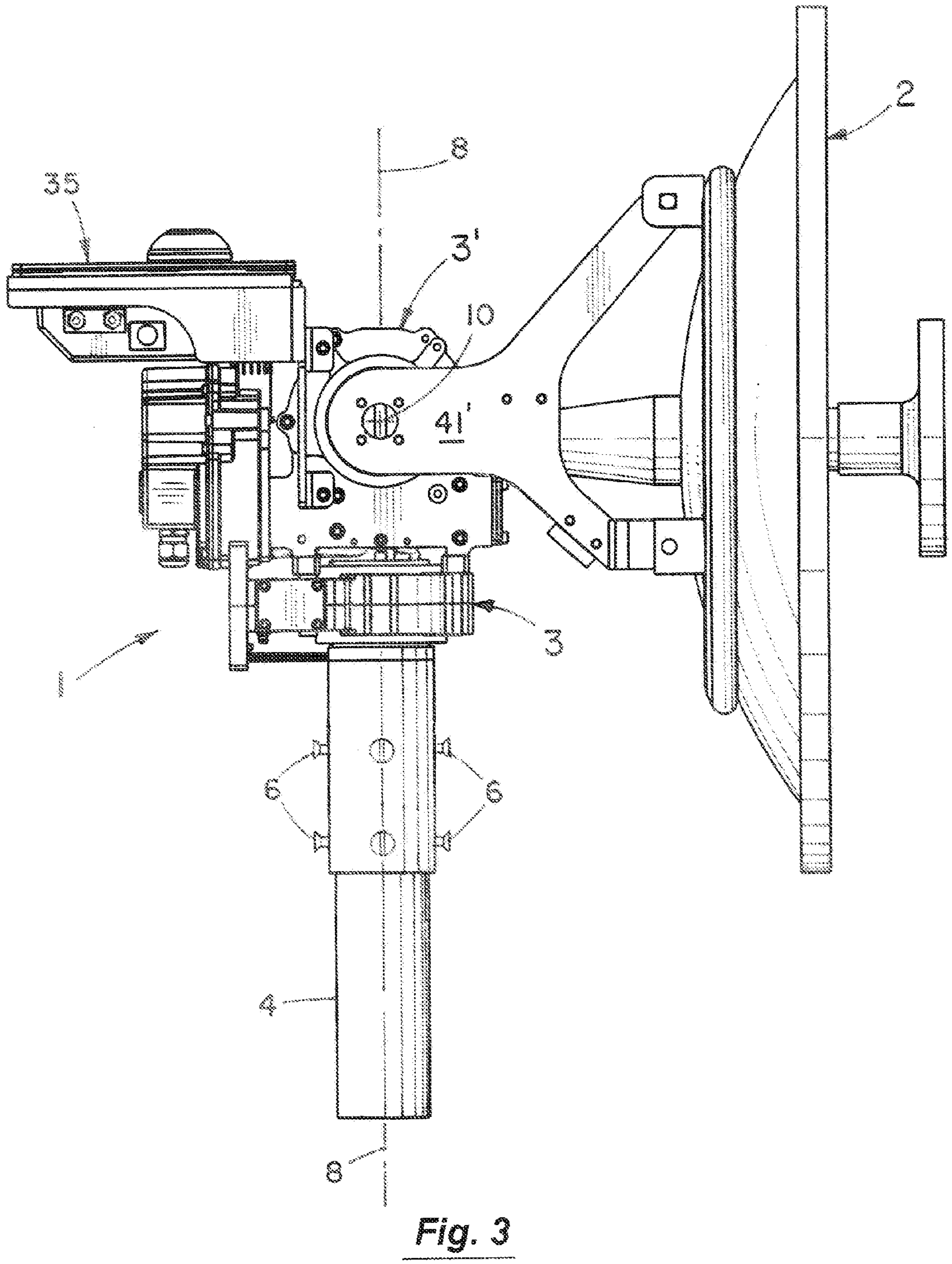
Figure 4:
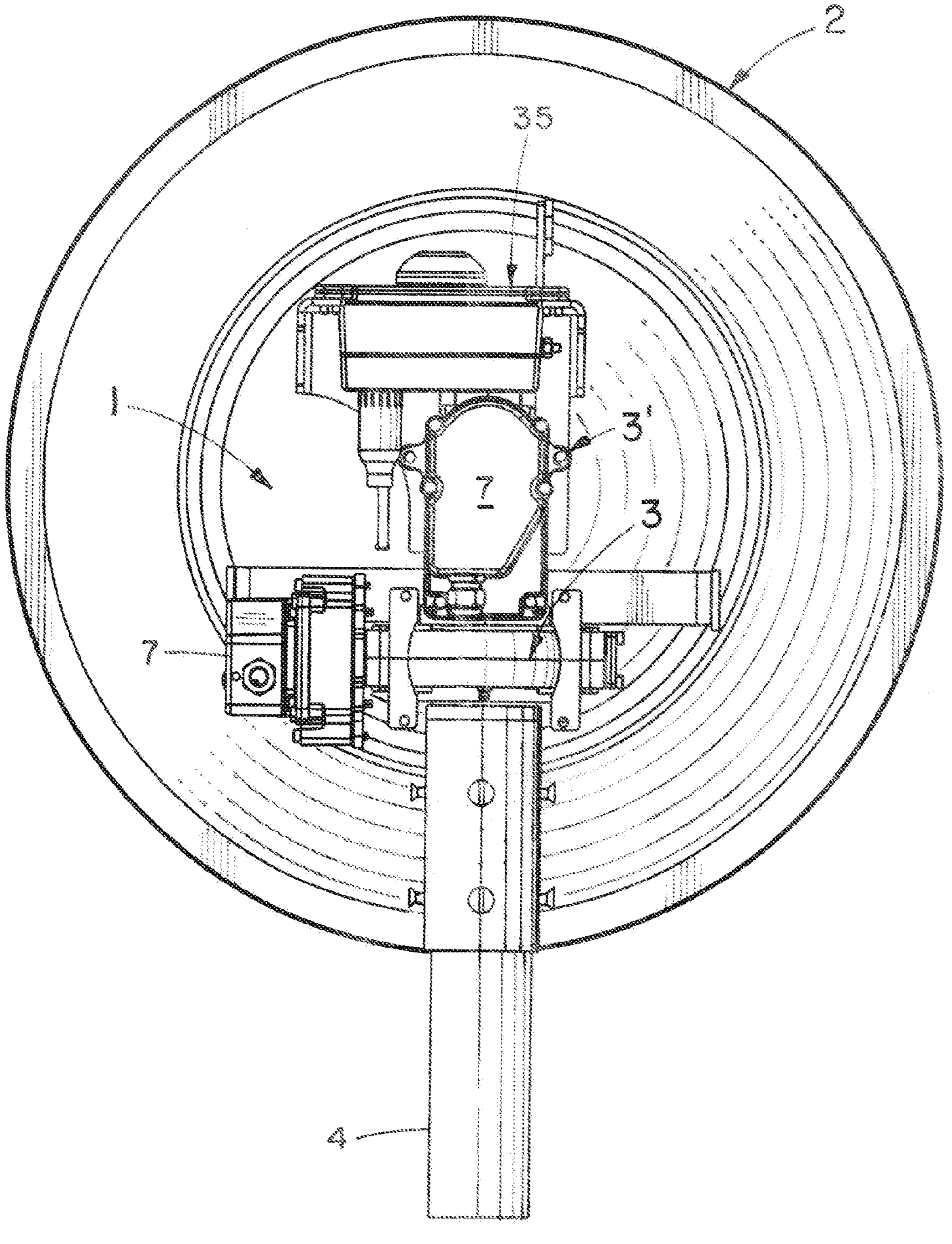
Figure 5:
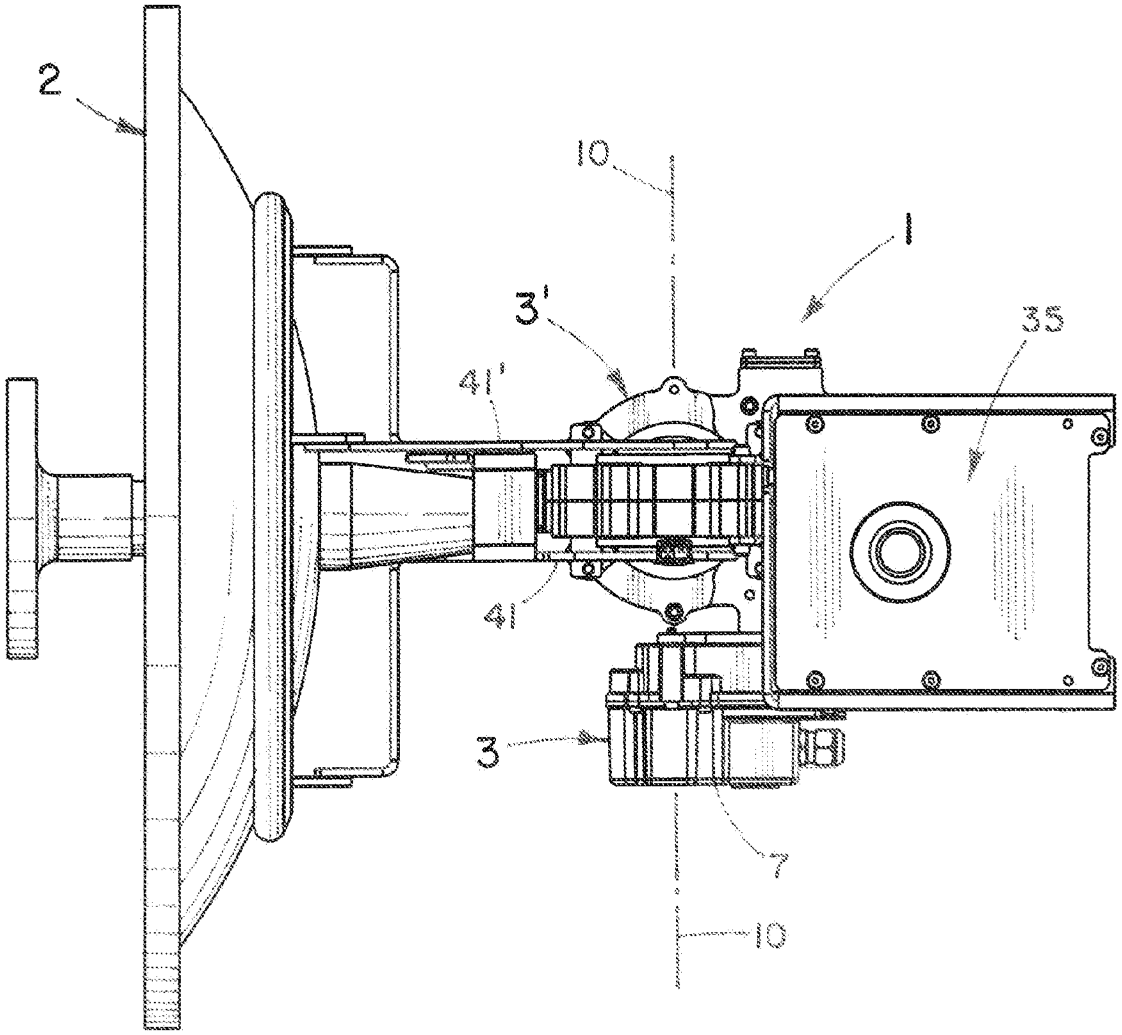
Figure 6:
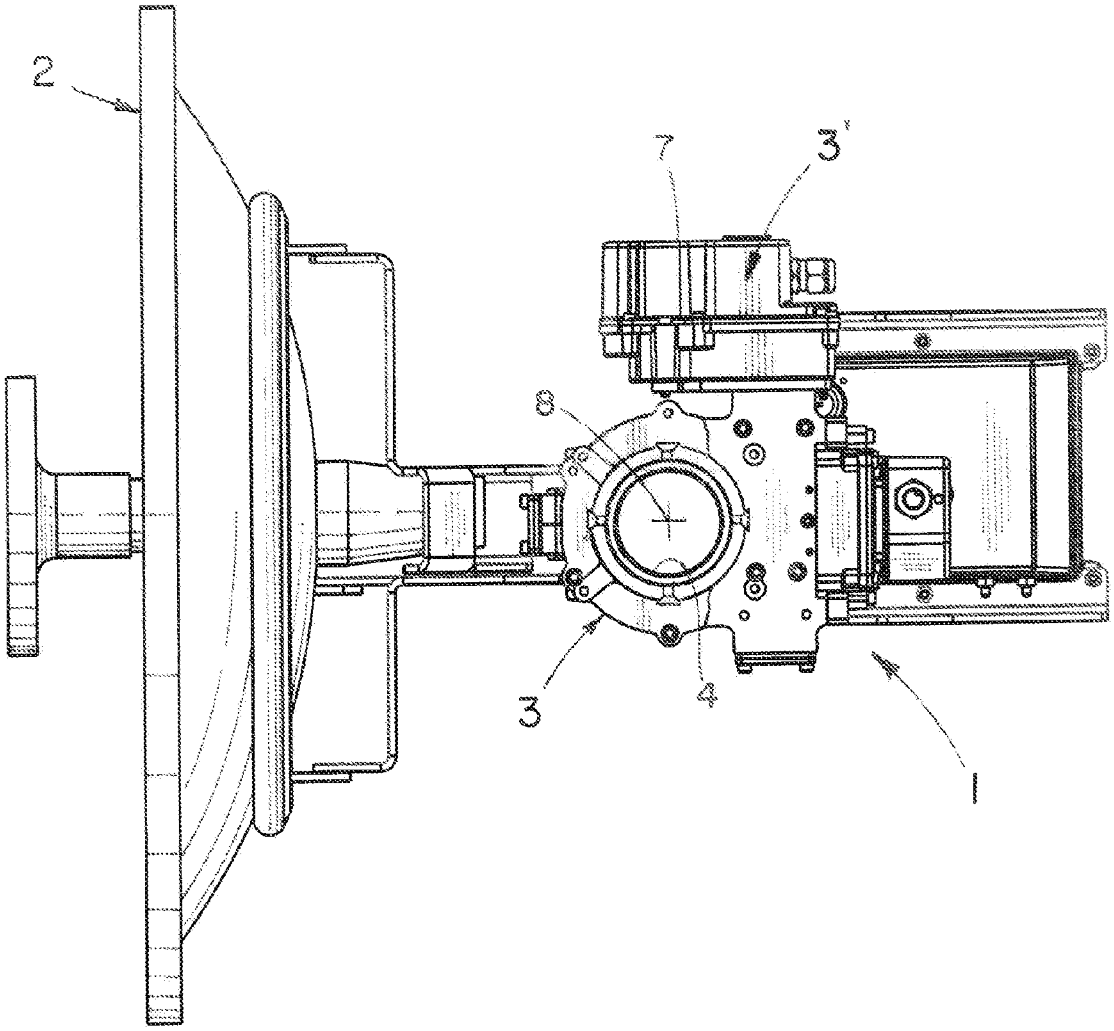

The antenna mount 1 of the present invention in the embodiment of FIG. 1 is designed to adjust the azimuth and elevation alignments of the antenna 2 (e.g., dish antenna) but as discussed below, its fundamental design can also be used to make skew adjustments to the antenna 2. In the embodiment of FIG. 1, the antenna mount 1 is fixedly securable to a support such as the post 4 by bolts 6 or other arrangements. The antenna mount 1 of FIG. 1 then has a first gearbox drive 3 for adjusting the azimuth alignment of the antenna 2 about the first or vertical axis 8 (see also FIGS. 2-6) and a second gearbox drive 3 for adjusting the elevation alignment of the antenna 2 about the second or horizontal axis 10.

Figure 7:
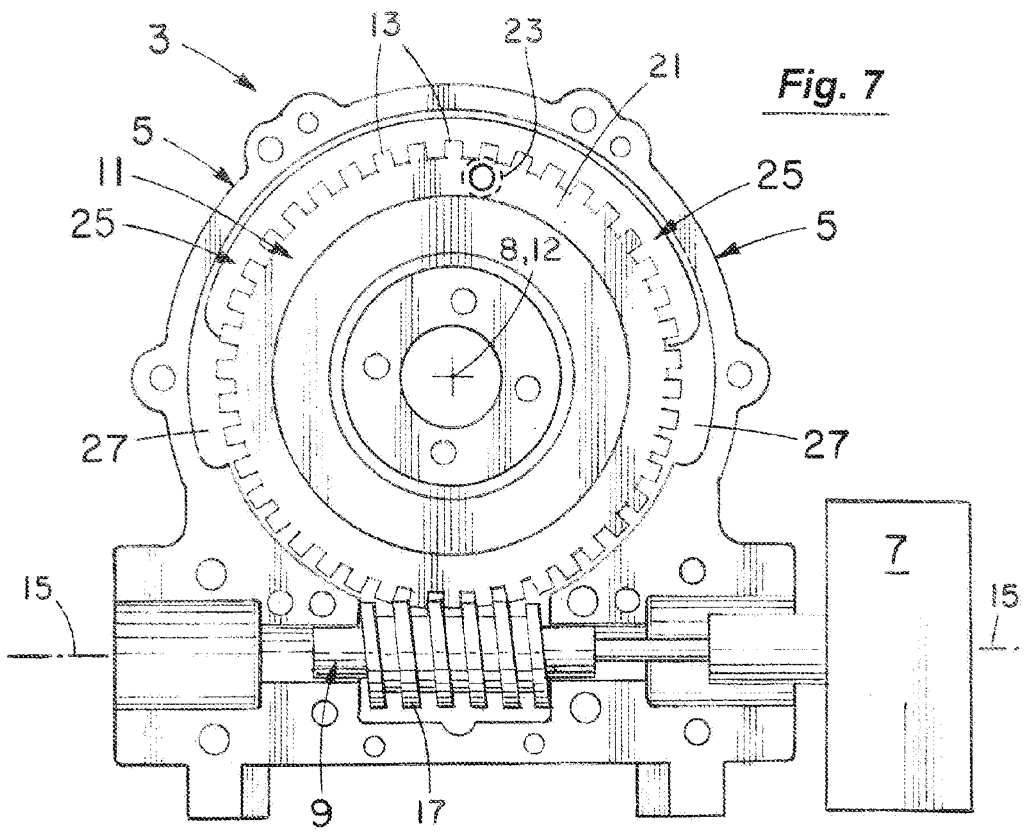
FIG. 7 is a cross-sectional view of the basic gearbox design as adapted primarily for azimuth adjustments.

The internal workings of the gearbox drive 3 for adjusting the azimuth alignment of the antenna 2 of FIG. 1 are shown in the cross-sectional view of FIG. 7. As illustrated in FIG. 7, the gearbox drive 3 has a body 5 with the motor 7 attached to it. The gearbox drive 3 also includes the worm gear 9 and the worm wheel 11. The worm wheel 11 in FIG. 7 has teeth 13 spaced from and extending substantially about the vertical axis 8. The worm gear 9 in turn extends along a substantially horizontal axis 15 and is mounted for rotation about the axis 15. The axis 15 as shown is spaced from and substantially perpendicular to the axis 8. The worm gear 9 includes a substantially helical thread 17 extending along and about the axis 15 with the helical thread 17 engaging the teeth 13 of the worm wheel 11.

The worm gear 9 of FIG. 7 is driven by the motor 7 to selectively rotate about the axis 15 in clockwise and counterclockwise directions. In doing so, the body 5 with the attached motor 7 and attached antenna 2 as explained in more detail below will then be selectively rotated clockwise and counterclockwise about the vertical axis 8 to adjust the azimuth alignment of the antenna 2.

Figures 8A, 8B, 8C:
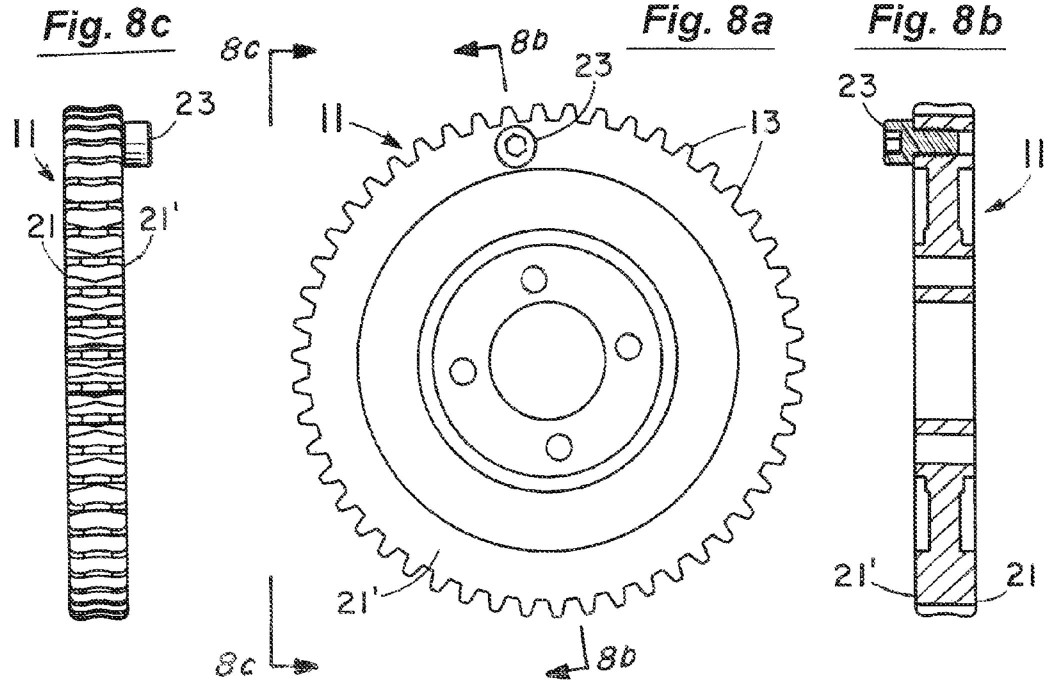
FIGS. 8*a*-8*c* are views of the worm wheel used in the basic design of the gearbox drive for the azimuth adjustments and in the subsequent gearbox drives for elevation and skew adjustments.
Figure 9:
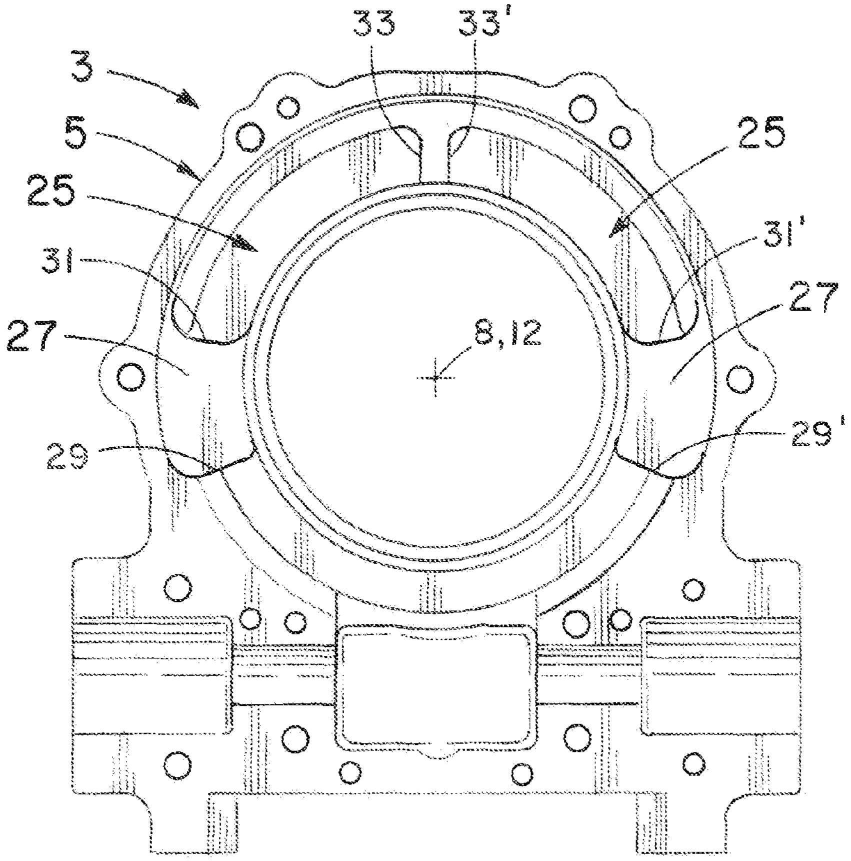
FIG. 9 is a view similar to FIG. 7 but with the worm wheel removed to more clearly show the arcuate member below it that is primarily designed for azimuth adjustments greater than 360 degrees.
Figure 10A:
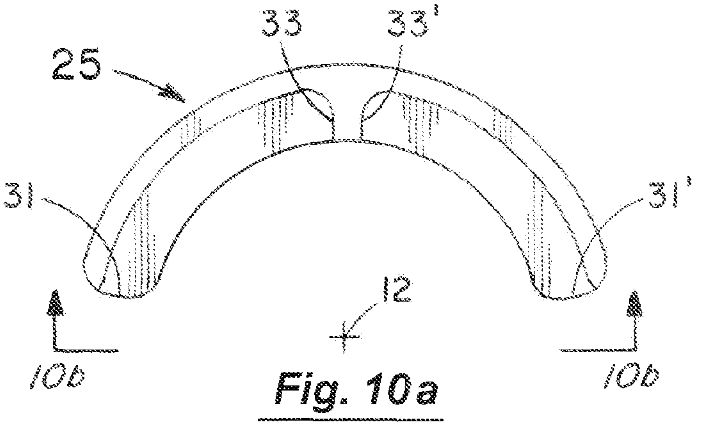
FIGS. 10*a*-10*b* illustrate details of the arcuate member of FIG. 9 that is primarily designed for azimuth adjustments.
Figure 10B:
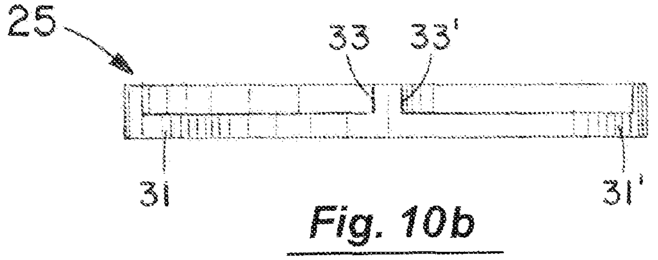
Figure 11:
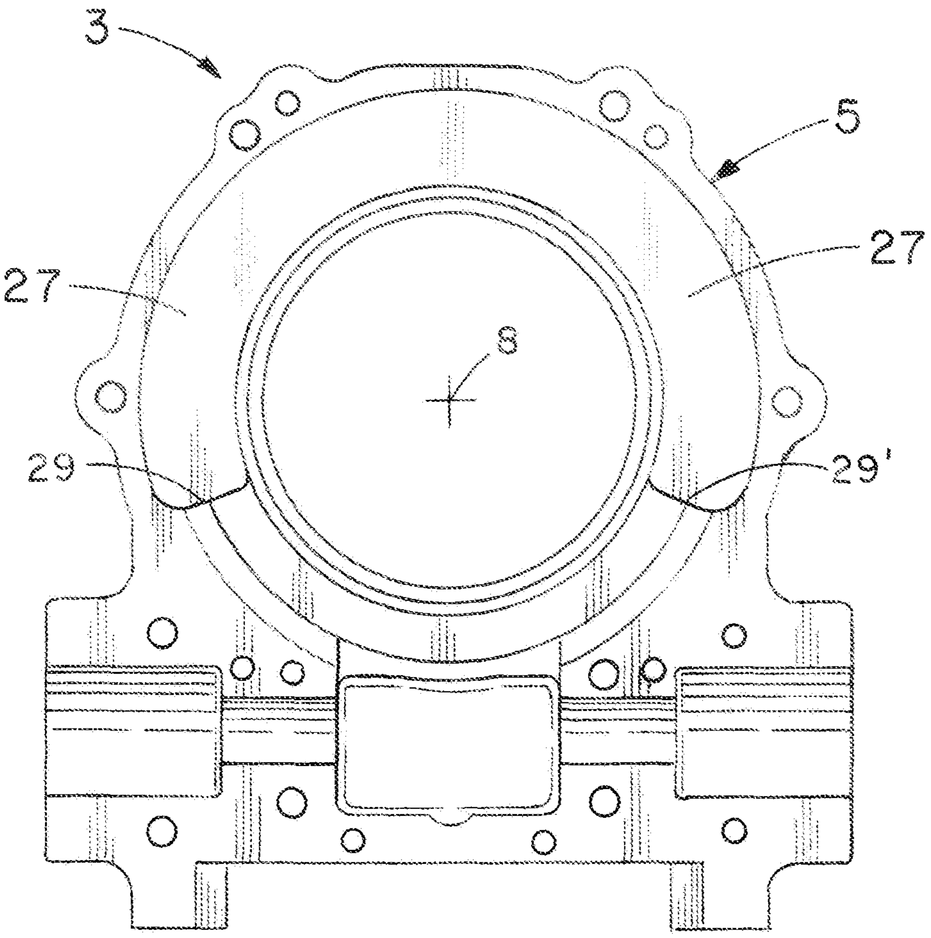
FIG. 11 is a view similar to FIG. 9 but with the arcuate member removed to show the groove in the underlying body of the gearbox that receives the arcuate member and relative to which the arcuate member moves.

Referring again to FIG. 7, the worm wheel 11 of the gearbox drive 3 has a substantially planar upper side 21 and a substantially planar lower or under side 21' (see also FIGS. 8*a*-8*c*). Both sides 21,21' respectively extend about the axis 8 in FIG. 7 and are substantially perpendicular to it. Adjacent the periphery of the lower or under side 21' of the worm wheel 11 is a pin member 23 (FIGS. 8*a*-8*c*) that protrudes away from the lower side 21' (i.e., into the page of FIG. 7). Beneath or below the worm wheel 11 of FIG. 7 is an arcuate member 25 (see also FIG. 9 which has the overlying worm wheel 11 of FIG. 7 removed). The arcuate member 25 as shown in FIGS. 10*a*-10*b* extends about a third axis 12 (FIG. 10*a*). The arcuate member 25 is mountable in the body 5 of the gearbox drive 3 in a first position in FIG. 7 beneath or under the worm wheel 11 of FIG. 7 with the axes 8 and 12 substantially collinear (see FIGS. 7 and 9). More specifically, the arcuate member 25 of FIG. 9 is positionable in an underlying arcuate groove 27 (see also FIG. 11 which has the arcuate member 25 of FIG. 9 overlying it removed). The groove 27 as shown extends about the axis 8 in the body 5 of the gearbox drive 3. The arcuate groove 27 of FIG. 11 has first and second end or stop portions 29,29' that are spaced from each other (e.g., 220-240 degrees) about the axis 8 and are fixed relative to each other and the body 5 of the gearbox drive 3. Similarly, the arcuate member 25 of FIG. 9 has first and second end portions 31,31' spaced from each other (e.g., 150-170 degrees) about the axes 8,12 in FIG. 9. The arcuate member 25 as shown in FIG. 9 also has first and second abutment surfaces 33,33' spaced from each other (e.g., 10-20 degrees) about the axes 8,12. The abutment surfaces 33,33' extend along the axes 8,12 (i.e., into the page in FIG. 9) to provide depth to them.

The arcuate member 25, groove 27, and protruding pin member 23 on the worm wheel 11 in FIGS. 7 and 8*a*-*c* together form a stop mechanism to limit the rotational movement or angle of the body 5 and attached motor 7 and antenna 2 about the axis 8. The body 5 and attached motor 7 and antenna 2 for the azimuth adjustment preferably move or rotate about the axis 8 in FIG. 7. However, for explanation purposes, it is believed easier to understand the relative movement involved by holding the body 5 stationary as in FIGS. 12*a*-12*e* and showing the arcuate member 25 and protruding pin member 23 on the worm wheel 11 as moving.

More specifically and referring again to FIG. 7, the motor 7 is seen to rotate the worm gear 9 about the axis 15 to in turn engage and drive against the worm wheel 11. For purposes of illustration in FIGS. 12*a*-12*e*, it is again assumed that the worm gear 9 in FIG. 7 and the body 5 of the gearbox 3 are stationary and the worm wheel 11 with the protruding pin member 23 is being rotated about the axis 8. In the initial position of FIGS. 7 and 12*a*, the protruding pin member 23 of FIG. 12*a* is then shown in a position against the abutment surface 33' of the underlying arcuate member 25. The protruding pin member 23 in FIG. 12*a* can then be rotated counterclockwise as in FIG. 12*b* about the axes 8,12 relative to the groove 27 in the body 5 to rotate it and the arcuate member 25 until the end portion 31 of the arcuate member 25 strikes the end or stop portion 29 of the groove 27. This predetermined position provides a first hard stop for references purposes for the azimuth search or sweep routine of the controller 35 of FIGS. 1-6. This first hard stop position can be sensed by the controller 35 in any number of manners including by monitoring an operating feature of the motor 7 such as its load or current draw. Other arrangements such as proximity switches could also be used. In any event, protruding pin member 23 of FIG. 12*b* can thereafter be rotated essentially 360 degrees clockwise in FIG. 12*c* to strike the other abutment surface 33 of the arcuate member 25. Further clockwise rotation of the protruding pin member 23 on to the positions of FIG. 12*d*-12*e* will then move it and the arcuate member 25 until the end portion 31' of the arcuate member 25 strikes the other end or stop portion 29' of the groove 27 in FIG. 12*e*. This position of FIG. 12*e* provides a second hard stop for reference purposes for the controller 35. It also represents the end of the total rotational movement or angle of the moving parts about the axes 8,12 of more than 360 degrees (e.g., 380-420 degrees) from the position of FIG. 12*a* to the position of FIG. 12*e*. Were the antenna 2 one of the moving parts as explained in more detail below, then it would have a total rotation angle of more than 360 degrees.

Figure 12C:
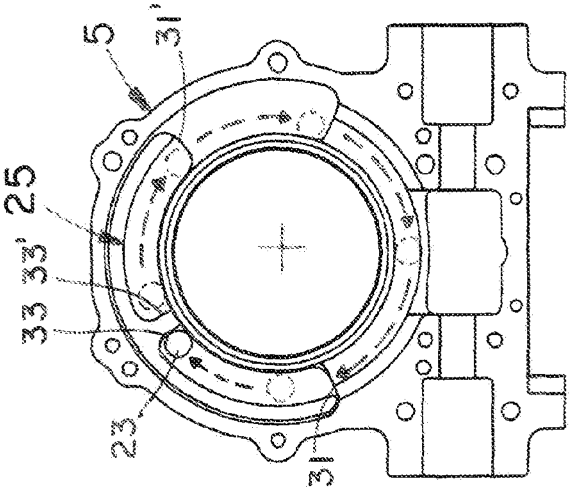
FIGS. 12*a*-12*e* sequentially illustrate the relative motion among the body of the gearbox drive with the attached motor, the worm wheel, and the arcuate member.
Figure 12B:
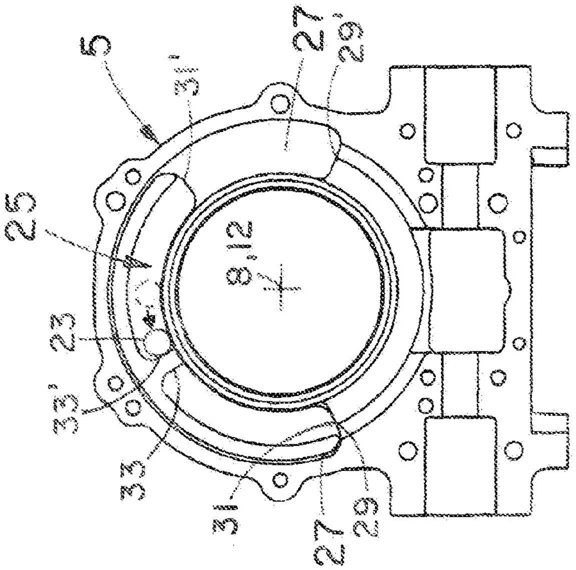
Figure 12A:
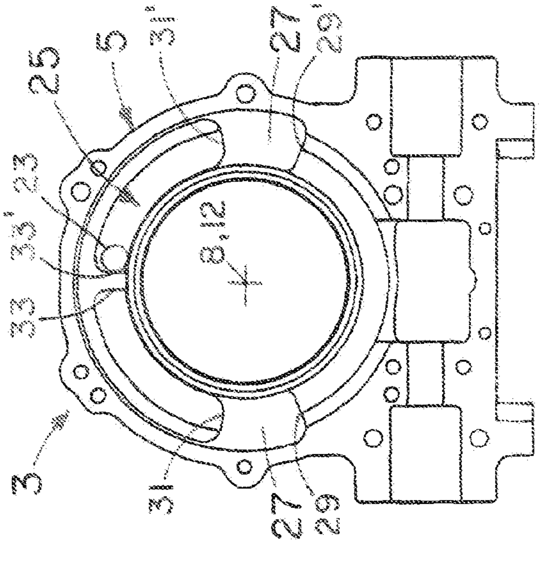
Figure 12E:
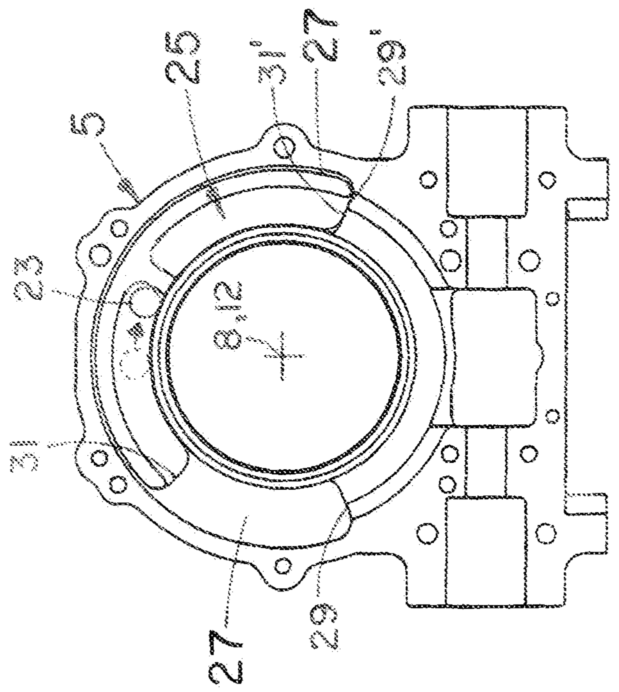
Figure 12D:
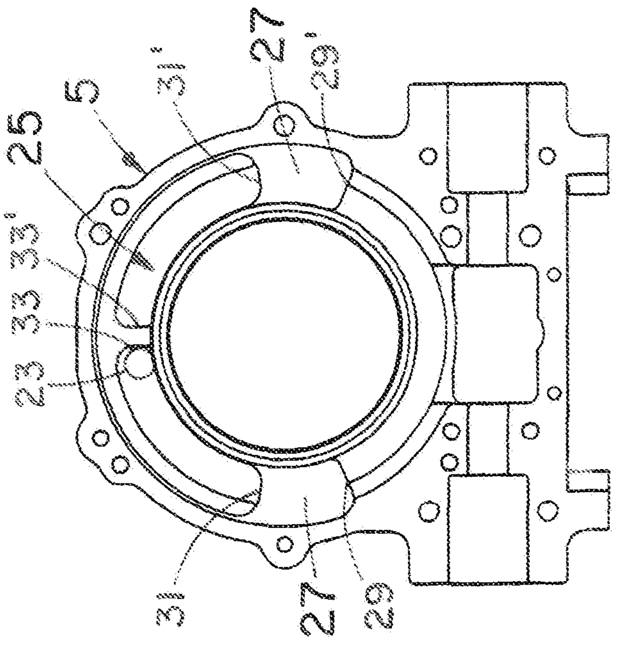
Figure 13C:
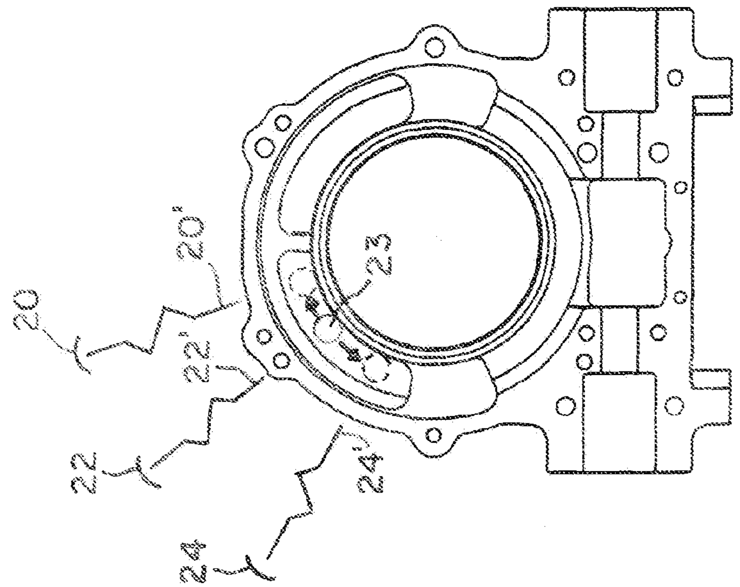
FIGS. 13*a*-13*e* illustrate the utility of the azimuth drive that permits the attached antenna to be efficiently and selectively aligned with three, closely positioned satellite signals.
Figure 13B:
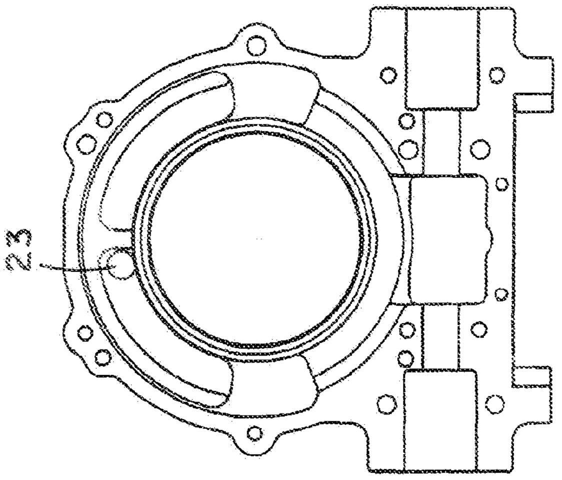
Figure 13A:
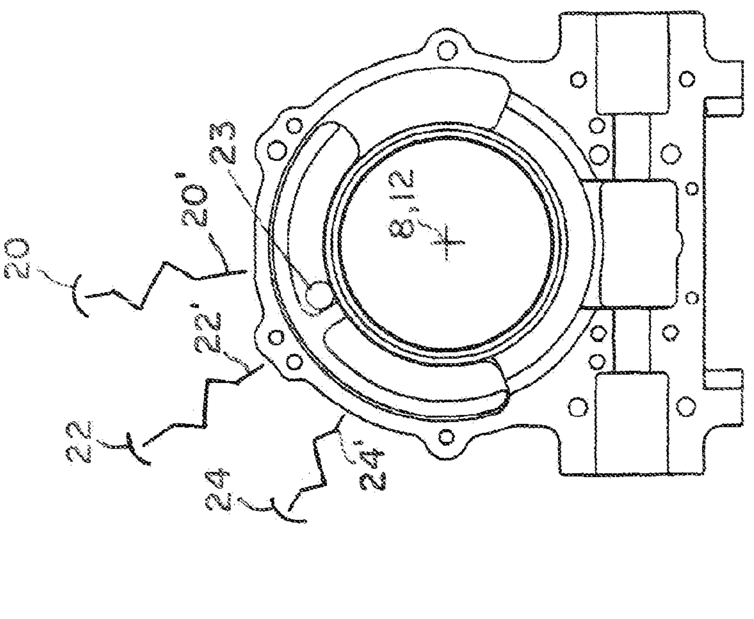
Figure 13E:
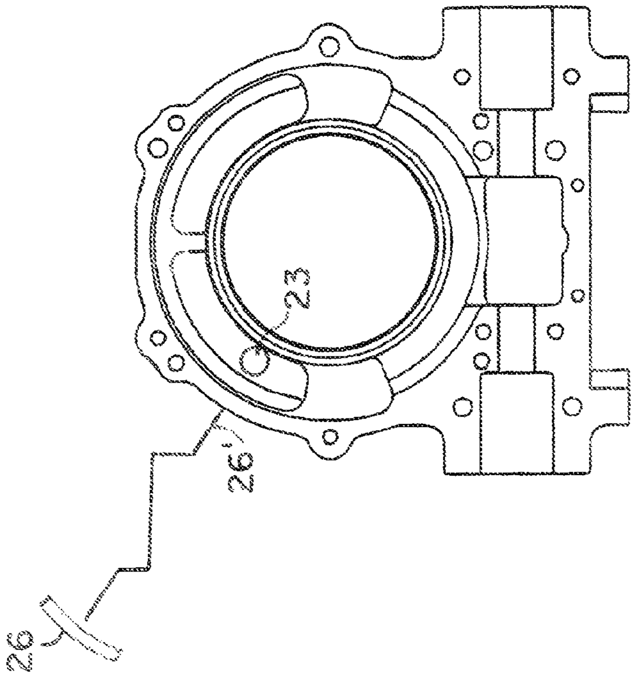
Figure 13D:
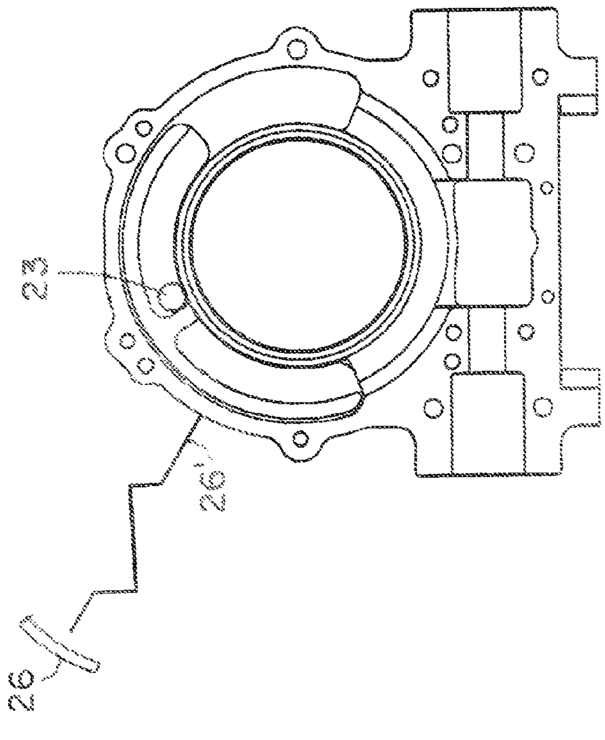

The desirability of a total rotational angle of more than 360 degrees is illustrated in FIGS. 13*a*-13*c* in which it is desired to efficiently and selectively align the antenna 2 with three, closely positioned satellites 20,22,24 (e.g., 6 degrees apart). That is, it may occur upon initial installation that the antenna 2 in the hard stop position of FIG. 13*a* (which is the same as in FIG. 12*b*) can be rotated 6 degrees between two of the satellites 20,22 to receive their signals 20,22', but, it cannot be rotated far enough counterclockwise in FIG. 13*a* to receive the signal 24' from the third satellite 24. The antenna 2 would then have to rotated clockwise all the way around the axes 8,12 to do so and then all the way back counterclockwise to again receive the signals 20',22'. To avoid this potential problem, the 380-420 degree operation of the antenna mount 1 of FIGS. 12*a*-12*e* will allow it after performing the search or sweep routine to return to a position such as that of FIG. 13*b* (which is the same as in FIG. 12*d*). From the position of FIG. 13*b*, the antenna mount 1 can thereafter be moved in the 12 degree range of the satellites 20,22,24 as in FIG. 13*c* to efficiently and selectively receive all three signals 20',22',24' as desired with the least amount of movement. Similarly and if the desired signal 26' as in FIG. 13*d* is a relatively close by, ground-based one with a relatively broad width (e.g., WiMax), the initial installation may block reception in the hard stop position of FIG. 13*d*. However, after performing all or part of the search routine, the 380-420 degree operation of the antenna mount 1 will permit it to be positioned in a number of workable locations including that of FIG. 13*e* to fully receive the signal 26' from the transmitter 26. These various arrangements and adjustments would be available whether the communications were one or two way.

Referring again to the two hard stop positions of FIGS. 12*b* and 12*e*, their primary purpose as mentioned above is to provide reference points for the search or sweep routine of the controller 35 of FIGS. 1-6. Additionally and should any exterior wiring be connected to the antenna mount 1, the hard stop positions will prevent any harm to them from excessive twisting about the axis 8.

Figure 14A:
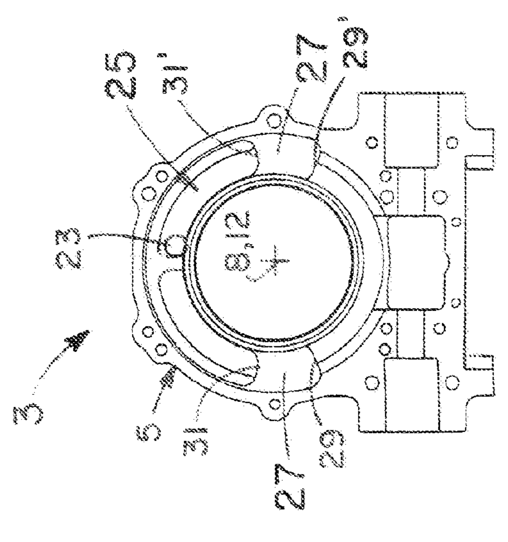
FIGS. 14*a*-14*c* illustrate the further versatility of the azimuth gearbox drive in which the body of the gearbox with the attached motor can be moved about the vertical axis relative to the stationary worm wheel (versus the opposite arrangement of FIGS. 12*a*-12*e*).
Figure 14B:
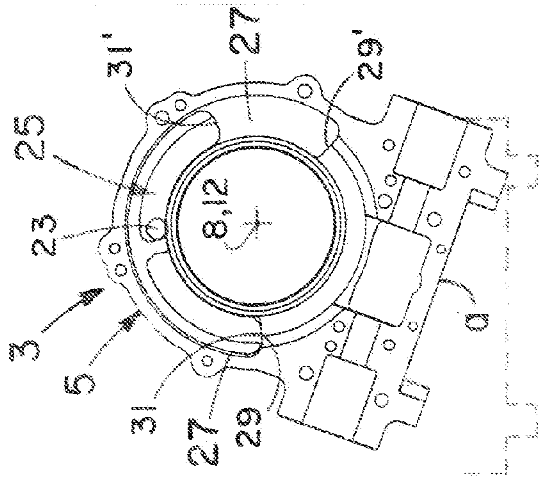
Figure 14C:
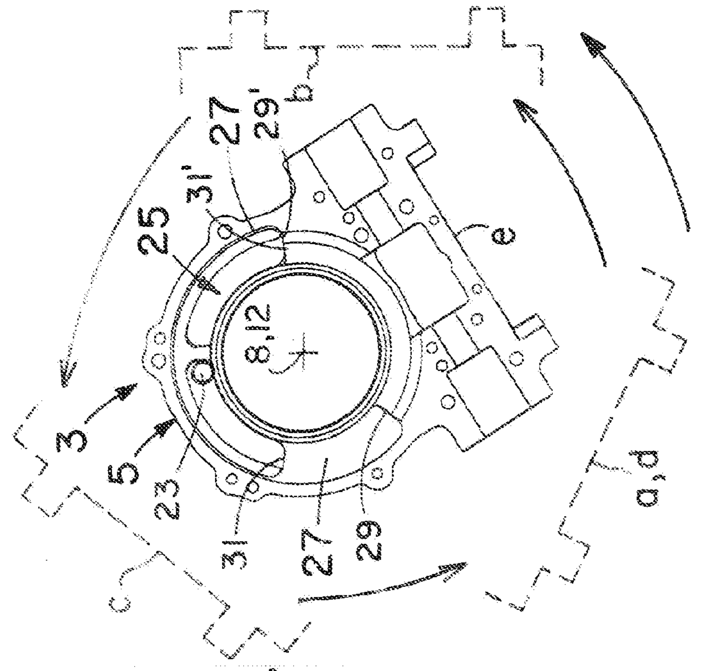
Figure 15:
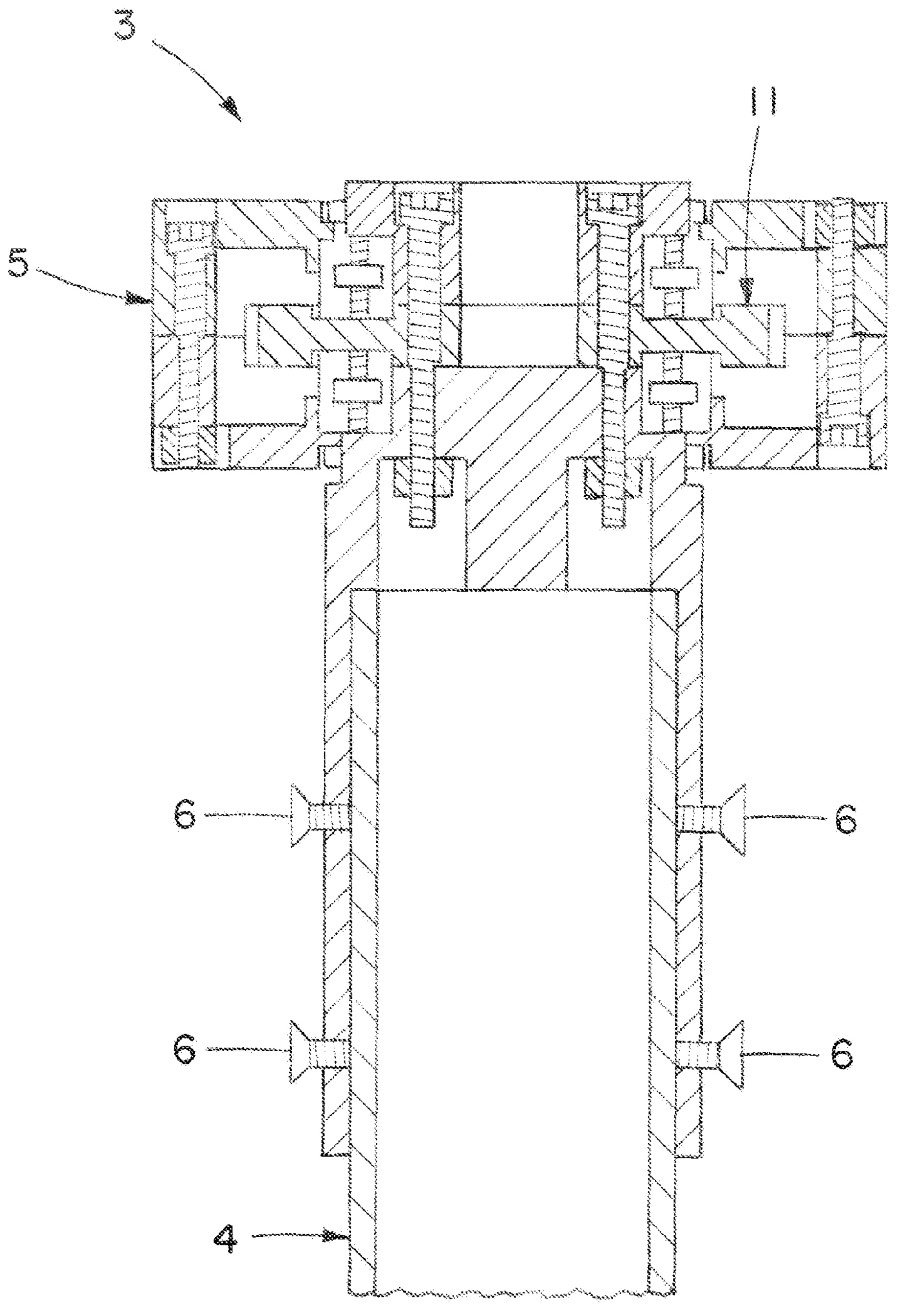
FIG. 15 illustrates one manner in which the worm wheel can be fixed in place so the body of the gearbox drive with the attached motor will then rotate relative to it about the vertical axis.

As also mentioned above, the worm wheel 11 in the azimuth gearbox 3 of FIG. 7 is preferably fixed in place and the body 5 of the gearbox 3 with the attached motor 7 and antenna 2 actually moving about the worm wheel 11 and axes 8,12 (e.g., from the initial position of FIG. 14*a* clockwise to the first hard stop position a of FIG. 14*b* and then counterclockwise 400 degrees from a through b-d and on to the second hard stop position e in FIG. 14*c*). The worm wheel 11 in this regard can be fixed in place in any number of manners including the one illustrated in FIG. 15. Although the worm wheel 11 is preferably fixed and the body 5 of the azimuth gearbox drive 3 moves, the reverse as in FIGS. 12*a*-12*e* could be employed in this or other applications.

Figure 16A:
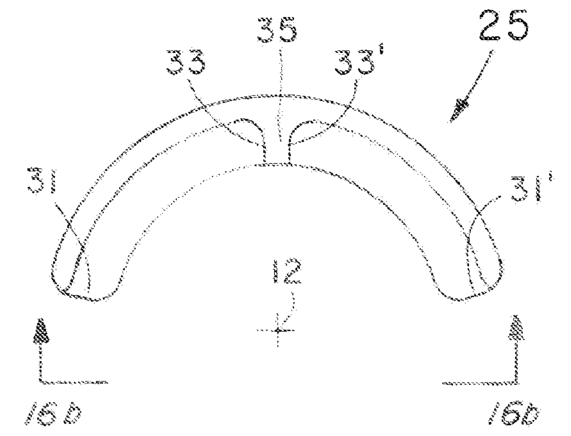
FIGS. 16*a*-16*b* again show details of the first arcuate member of FIG. 9 that is primarily designed for azimuth adjustments.
Figure 16B:
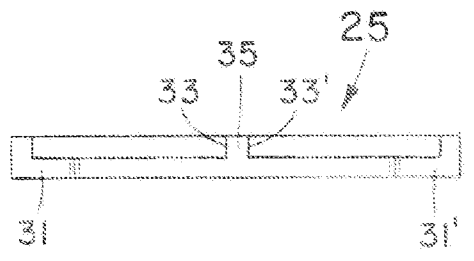

In the embodiment of FIGS. 1-16*b*, the arcuate member 25 of FIG. 16*a* in the gearbox drive 3 of FIG. 7 moves or slides in the groove 27 about the axes 8,12 as in FIGS. 12*a*-12*e* and 14*a*-14*c*. This arcuate member 25 as previously mentioned has end portions 31,31' spaced from each other (e.g., 150-170 degrees) about the axis 12 (FIG. 16*a*). The groove 27 in FIGS. 9 and 11 in turn as also previously mentioned has end or stop portions 29,29 radially spaced (e.g., 220-240 degrees) from each other more than the spaced-apart, end portions 31,31' of the arcuate member 25. In this manner, the desired movement or sliding of the arcuate member 25 in the groove 27 and the desired rotation of the antenna 2 more than 360 degrees (e.g., 400 degrees) about the axis 8 are possible. The arcuate member 25 of FIGS. 16*a*-16*b* as previously discussed has substantially centrally positioned abutment surfaces 33,33' about the axis 12 for the protruding pin member 23 on the worm wheel 11 to strike. These abutment surfaces 33,33' are respectively radially spaced substantially the same number of degrees about the third axis 12 in FIG. 16*a* from the respective first and second end portions 31,31' of the arcuate member 25. The abutment surfaces 33,33' are on opposite sides of the member 35 in FIGS. 16*a*-16*b* and face away from each other. Depending upon whether the body 5 of the gearbox drive 3 is fixed as in FIGS. 12*a*-12*e* or the worm wheel 11 is fixed as in FIGS. 14*a*-14*c*, either the protruding pin member 23 or the abutments surfaces 33,33' are moved in a curved path about the axes 8,12 to strike the other of the pin member 23 and surfaces 33,33' which would then be held stationary.

Figure 17A:
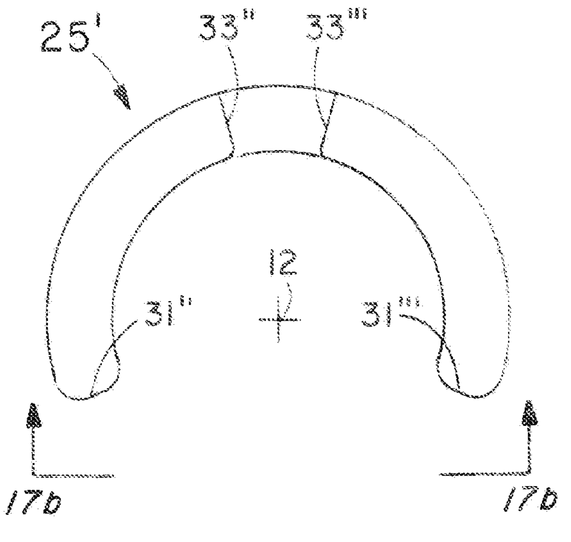
FIGS. 17*a*-17*b* illustrate details of a modified or second arcuate member that can be substituted in the basic gearbox design for the first arcuate member of FIG. 9 to make a gearbox drive more suitable for limited movement or rotation.
Figure 17B:
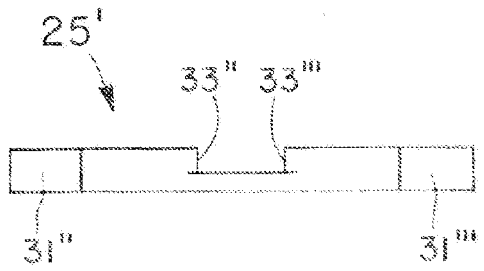
Figure 18B:
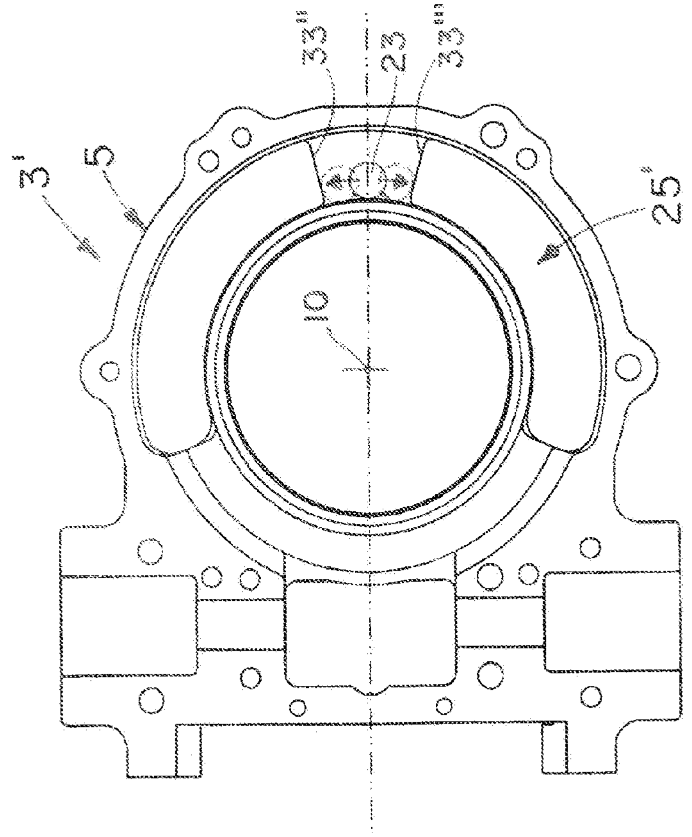
FIGS. 18*a*-18*b* then show a modified gearbox drive with the second arcuate member of FIGS. 17*a*-17*b* in it for more limited movement or rotation about a vertical axis (FIG. 18*a*) or more appropriately about a horizontal axis (FIG. 18*b*) to make elevation adjustments to the attached antenna.
Figure 18A:
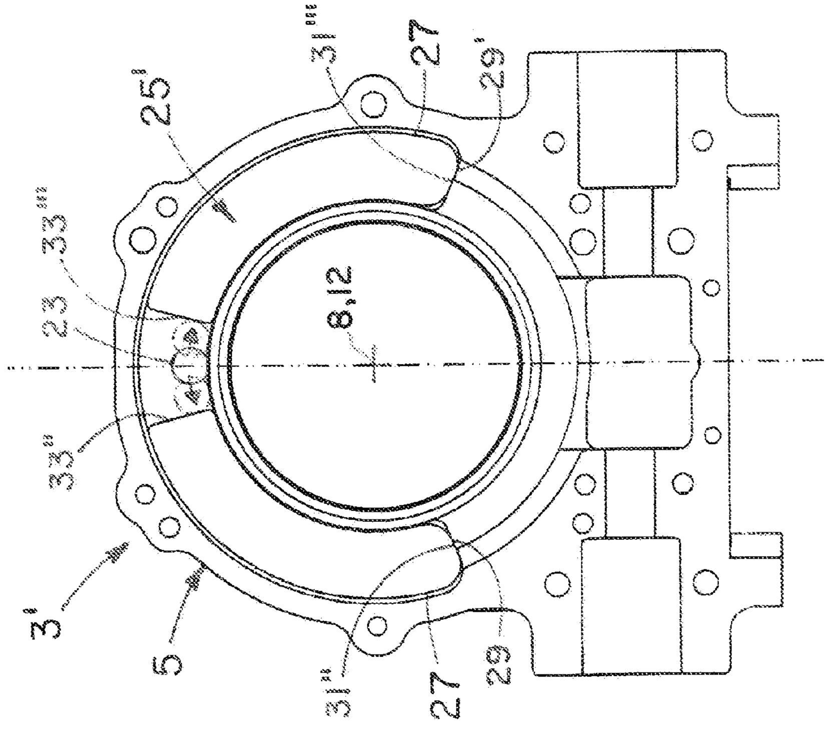

Although the embodiment of FIGS. 1-16*b* is preferably designed for adjusting the azimuth alignment of the antenna 2, the simplicity of the gearbox drive 3 permits it to be quickly and easily modified for more limited azimuth adjustments if desired or other alignments such as elevation and skew. This can be accomplished for example by simply replacing the arcuate member 25 of FIGS. 16*a*-16*b* with the arcuate member 25' of FIGS. 17*a*-17*b* as in FIG. 18*a*. The arcuate member 25' in the modified gearbox 3' of FIG. 18*a* can then be used to confine the relative rotation of the body 5 and protruding pin member 23 of the modified gearbox 3' to a much smaller rotational angle (e.g., 10-30 degrees about the axis 8). That is, the arcuate member 25' of FIGS. 17*a*-17*b* and 18*a* extends about the axes 8,12 essentially the same radial amount (e.g., 220-240 degrees) as the underlying groove 27. The end portions 31,31" of the arcuate member 25' in FIG. 18*a* are then essentially up against the end portions 29,29' of the groove 27. The arcuate member 25' is thus fixed in place in this first position and the relative rotation of the protruding pin member 23 on the worm wheel 11 is restricted to between the abutment surfaces 33", 33" in FIG. 18*a*. All of this is accomplished by simply replacing the arcuate member 25 of FIGS. 7-16*b* with the arcuate member 25' of FIGS. 17*a*-17*b*. The modified gearbox drive 3" of FIG. 18*a* could then be used for more limited azimuth adjustments but is really more suitable for use for elevation and skew adjustments of the antenna 2. In use for elevation adjustments, the modified gearbox drive 3' of FIG. 18*a* would then be supported as in FIG. 18*b* with the body 5 of the modified gearbox drive 3' fixed in place and the worm wheel 11 of FIG. 7 allowed to move with the antenna 2 mounted to it about the horizontal axis 10 of FIG. 18*b*.

Figure 19:
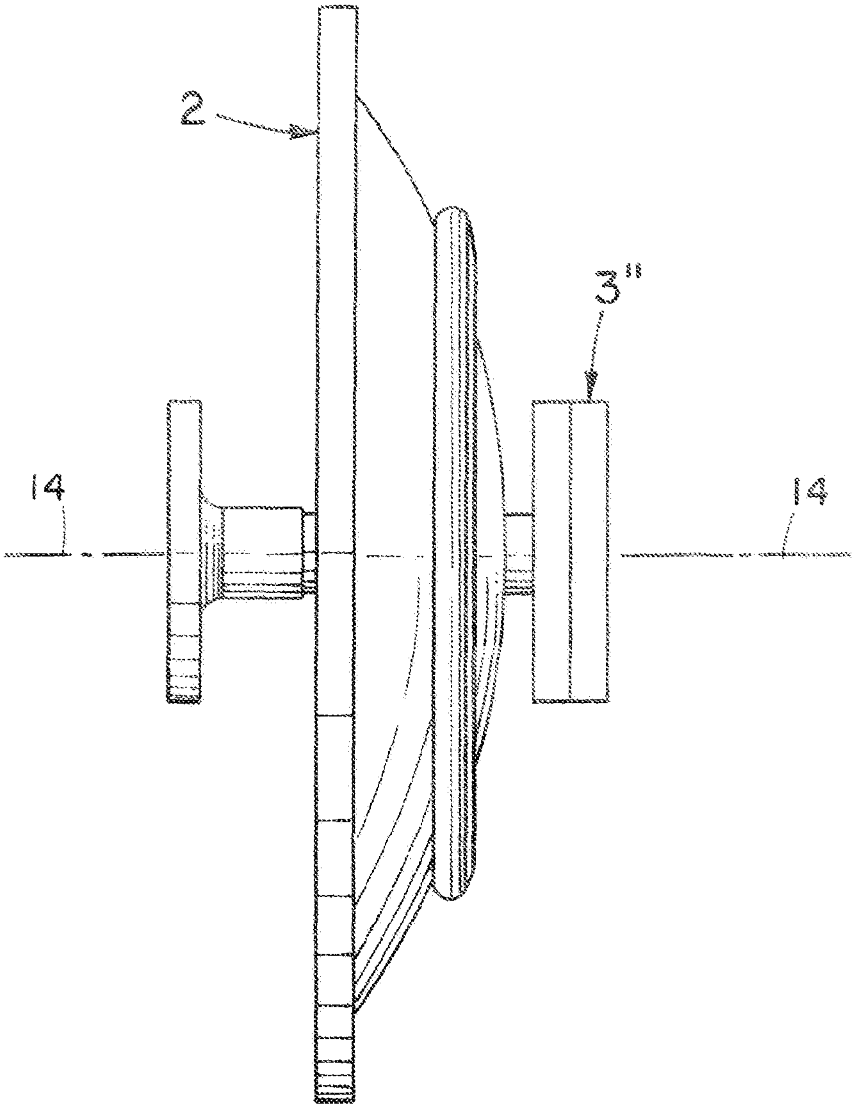
FIG. 19 is a schematic view of the basic gearbox drive in use to adjust the skew alignment of the antenna.

That is and referring to FIGS. 1-3 and 5, the antenna 2 is secured by the straddling brackets 41,41' to the worm wheel in the modified gearbox drive 3'. This can be done in any number of manners including one similar to the arrangement of FIG. 15. The antenna 2 then moves with the worm wheel in the modified gearbox drive 3' about the horizontal axis 10 of FIGS. 1-6 and 18*b*. In this regard and in the modified gearbox drive 3' as mentioned above, the body 5 with the attached motor 7 of FIG. 7 is fixed and the worm wheel 11 rotates. As indicated above, the limited range of rotation (e.g., 10-30 degrees) of the modified gearbox drive 3' is usually more suitable for elevation adjustments and in particular, horizontal line-of-sight signals such as used in WiMax and other one or two-way ground communications. Physical restraints may also dictate this limited adjustment range as elevation movement of the antenna 2 beyond these ranges in the compact design of the antenna mount 1 of FIGS. 1-6 may cause the antenna 2 to undesirably strike the support post 4 or other items that may be positioned on or adjacent the antenna mount 1. However, other applications of the modified gearbox drive 3' are anticipated when for example the desired elevation adjustment range may be greater and physically permitted (e.g., a total of 60-90 degrees) or if the adjustment is to the skew about the axis 14 as in FIG. 19 using gearbox drive 3" when an even greater range (e.g., up to about 180 degrees) may be desired. In such cases, the abutment surfaces 33",33" on the arcuate member 25' in FIGS. 17*a*-18*b* which face toward each other would be radially spaced farther apart as needed.

Although the gearbox drives 3 and 3' have a different arcuate members 25,25', their fundamental operations are essentially the same. That is, they both have the same common elements as in FIG. 7 except for the arcuate member 25,25' and whether the worm wheel 11 is mounted to be the fixed or rotating element versus the body 5 of the gearbox with the attached motor 7. Regardless and in both cases, the antenna 2 is mounted to move with the non-fixed or rotating element(s). Stated another way, either the body 5 with the attached motor 7 or the worm wheel is mounted for rotation about an axis (i.e., 8 or 10) with the antenna 2 mounted to move with the one that rotates.

The stop mechanisms in both gearbox drives 3 and 3' similarly have common elements and operating traits. That is, the stop mechanism of the first embodiment of FIGS. 1-16a includes the arcuate member 25, the groove 27, and the protruding pin member 23 on the worm wheel 11 (see FIG. 7). The stop mechanism of the second embodiment of FIGS. 17a-18b also includes the groove 27 and protruding pin member 23 on the worm wheel 11 but with the arcuate member 25' of FIGS. 17a-18b substituted for the arcuate member 25 in the first embodiment of FIGS. 1-16a. Functionally, both stop mechanisms serve to limit the rotational movement or angle of the moving or rotating one of the body 5 with the attached motor 7 or the worm wheel 11. In the first embodiment for the azimuth gearbox drive 3, the stop mechanism limits the rotational angle of the moving body 5 with the attached motor 7 and antenna about the vertical axis 8 as in FIGS. 14a-14c. In the second embodiment of FIG. 18b for the elevation gearbox drive 3', the stop mechanism limits the rotation angle of the moving or rotating worm wheel with the attached antenna about the horizontal axis 10. In both cases, each stop mechanism has an abutment arrangement with first and second abutment surfaces (i.e., 33,33' in the first embodiment of FIGS. 1-16b and 33",33" in the second embodiment of FIGS. 17a-18b). Depending upon whether the worm wheel 11 is fixed or allowed to rotate, the protruding pin member 23 on it either is held stationary and the abutment surfaces 33,33' moved along a curved path to strike it (see FIGS. 14a-14c) or the protruding pin member 23 is moved along a curved path as in FIGS. 18a-18b to strike the stationary abutment surfaces 33",33" held fixed in the curved path. Consequently, with simply the substitution of arcuate members 25 and 25' and with the worm wheel 11 either held fixed or allowed to rotate relative to the body 5 of the gearbox, multiple operations are possible using essentially the same gearbox drives. In this manner, the cost and complexity of manufacture and assembly of the antenna mount 1 of the present invention is decreased and its installation, operation, and maintenance facilitated.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims. In particular, it is noted that the word substantially is utilized herein to represent the inherent degree of uncertainty that may be attributed to any quantitative comparison, value, measurement or other representation. This term is also utilized herein to represent the degree by which a quantitative representation may vary from a stated reference without resulting in a change in the basic function of the subject matter involved.

We claim:

1. An antenna mount (1) for adjusting at least one of the azimuth, elevation, and skew alignments of an antenna (2), said antenna mount (1) including:

at least one gearbox drive (3,3') having a body (5), a motor (7) attached to the body, a worm gear (9), and a worm wheel (11), one of said body (5) with the attached motor (7) and said worm wheel (11) being mounted for rotation about a first axis (8,10), said worm wheel (11) having teeth (13) spaced from and extending substantially about said first axis (8,10), said worm gear (9) extending along a second axis (15) and being mounted for rotation about said second axis (15), said second axis (15) being spaced from and substantially perpendicular to said first axis (8,10), said worm gear (9) having a substantially helical thread (17) extending along and about said second axis (15) and engaging the teeth (13) of said worm wheel (11), said worm gear being driven by said motor (7) to selectively rotate about said second axis (15) in clockwise and counterclockwise directions to selectively rotate one of the body (5) with the attached motor (7) and the worm wheel (11) in clockwise and counterclockwise direction about said first axis (8,10), said antenna (2) being mountable to move with the one of the body (5) with the attached motor (7) and said worm wheel (11) about said first axis (8,10), said gearbox drive (3,3') further including a stop mechanism to selectively limit the rotation angle of the one of the body (5) with the attached motor (7) and the said worm wheel (11), said stop mechanism including an arcuate member (25,25') extending about a third axis (12) between first and second end portions (31,31' and 31",31") and being mountable in a first position in said gearbox drive (3,3') adjacent said worm wheel (11) with the first and third axes (8,12 and 10,12)) substantially collinear, said worm wheel (11) having a substantially planar side (21') extending about said first axis (8,10) and substantially perpendicular thereto and at least one pin member (23) positioned substantially adjacent the periphery of the worm wheel (11) and protruding away from the planar side (21') thereof, said arcuate member (25,25') of said stop mechanism having at least one abutment arrangement with at least first and second abutment surfaces (33,33' and 33",33") spaced from each other about said third axis (12) with said abutment surfaces (33,33' and 33",33") respectively extending along said third axis (12), one of said protruding pin member (23) on said worm wheel (11) and said abutment surfaces (33,33' and 33",33"') of said arcuate member (25,25') being movable about said first axis (8,10) along a curved path with the other of said protruding member (23) and abutment surfaces (33,33' and 33", 33") remaining stationary in said curved path with said arcuate member (25,25') of said stop mechanism positioned in the gearbox drive (3,3') in said first position with the first and third axes (8,12 and 10,12) collinear, said motor selectively rotating the worm gear clockwise and counterclockwise about the second axis (15) to selectively rotate the one of the body (5) with the attached motor (7) and the worm wheel (11) clockwise and counterclockwise about the first axis (8,10) to move the one of the protruding pin member (23) on the worm wheel (11) and the abutment surfaces (33,33' and 33", 33") of the arcuate member (25,25') about the first axis (8,10) to selectively abut the protruding pin member (23) and said first and second abutment surfaces (33,33' and 33",33"') of the arcuate member (25,25').

2. The antenna mount of claim 1 wherein said stop mechanism further includes an arcuate groove (27) in said gearbox drive (3,3') extending about said first axis (8,10) to receive the arcuate member (25,25') therein, said groove (27) having first and second, fixed stop portions spaced from each other about said first axis (8,10).

3. The antenna mount of claim 2 wherein said arcuate member (25) has first and second end portions (31,31') spaced from each other about the third axis (12) and the stop portions (29,29') of the groove (27) are spaced from each other radially about the first axis (8,10) more than said first and second end portions (31,31') of the arcuate member (25) are spaced from each other about the third axis (12).

4. The antenna mount of claim 3 wherein with the arcuate member received in said groove (27) with the first and third axes (8,12) collinear and the protruding pin member (23) on the worm wheel (11) being the stationary one and the antenna (2) being mounted to move with the body (5) of the gearbox drive (3), said body (5) is rotatable in said clockwise direction about the first axis (8) by the drive motor (7) and worm gear (9) to rotate said abutment surfaces (33,33') along said curved path to strike one of the abutment surfaces (33,33') on said arcuate member (25) against the protruding pin member (23) and rotate the arcuate member (25) about the first axis (8) to a first predetermined stop position with the first end portion (31) of said arcuate member (25) abutting the first stop portion (29) of the groove (27).

5. The antenna mount of claim 4 wherein with the arcuate member (25) in said first predetermined stop position, the body (5) is rotatable in said counterclockwise direction about the first axis (8) by the drive motor (7) and worm gear (9) to rotate said abutment surfaces (33,33) along said curved path to strike the other of the abutment surfaces (33,33') on said arcuate member (25) against the protruding pin member (23) and rotate the arcuate member (25) about the first axis (8) to a second predetermined stop position with the second end portion (31') of said arcuate member (25) abutting the second stop portion (29') of the groove (27).

6. The antenna mount of claim 5 wherein the first and second abutment surfaces (33,33') move along said curved path between substantially 380 and 420 degrees as said arcuate member (25) is moved between said first and second predetermined stop positions.

7. The antenna mount of claim 3 wherein said first and second abutment surfaces (33,33') face away from each other about said first axis (8).

8. The antenna mount of claim 7 wherein each of said first and second abutment surfaces (33,33') is respectively radially spaced substantially the same number of degrees about the third axis from the respective first and second end portions (31,31') of the arcuate member (25).

9. The antenna mount of claim 7 wherein said first and second abutment surfaces (33,33') are on opposite sides of an abutment member extending substantially along the third axis (12).

10. The antenna mount of claim 7 wherein said first and second abutment surfaces (33,33') are radially spaced from each other about the first axis (8) substantially between 10 and 20 degrees.

11. The antenna mount of claim 3 wherein the end portions (31,31') of the arcuate member (25) are radially spaced substantially between 150 and 170 degrees from each other about the third axis (12).

12. The antenna mount of claim 3 wherein the first and second fixed, stop portions (29,29') of said groove (27) are radially spaced substantially between 220 and 240 degrees from each other about the first axis (8).

13. The antenna mount of claim 2 wherein said first and second stop portions (29,29') of said groove (27) are radially spaced from each other about said first axis substantially the same as said first and second end portions (31",31") of said arcuate member (25') are radially spaced from each other about said third axis (12), said protruding pin member (23) being positionable between the first and second end portions (31",33") of said arcuate member (25') wherein said worm wheel is rotatable in said counterclockwise direction about said first axis by said drive motor (7) and worm gear (9) to rotate said protruding pin member (23) along said curved path to strike the first abutment surface (33") of said arcuate member (25') in a first predetermined stop position and wherein said worm wheel is rotatable in said clockwise direction about said first axis by said drive motor (7) and worm gear (9) to rotate said protruding pin member (23) along said curved path to strike the second abutment surface (33'") of said arcuate member (25') in a second predetermined stop position.

14. The antenna mount of claim 13 wherein said first and second abutment surfaces (33",33') of the arcuate member (25') face toward each other about the first axis.

15. The antenna mount of claim 14 wherein each of said first and second abutment surfaces (33",33'") is respectively radially spaced substantially the same number of degrees about the third axis from the respective first and second end portions (31",31") of the arcuate member (25').

16. The antenna mount of claim 13 wherein the first and second abutment surfaces (33",33'") are spaced substantially between 10 and 20 degrees from each other radially about the first axis.

17. The antenna mount of claim 13 wherein the first and second abutment surfaces are spaced substantially between 60 and 180 degrees from each other radially about the first axis.

18. The antenna mount of claim 13 wherein said first and second end portions of said arcuate member (25') and said first and second stop portions 29,29') of said groove (27) are respectively spaced substantially between 220 and 240 degrees from each other about the first axis.

19. The antenna mount of claim 2 wherein the arcuate member (25) has first and second end portions (31,31') radially spaced from each other about the first axis less than the first and second, fixed stop portions of said groove (27) are radially spaced from each other about the first axis and said arcuate member 25' is removable from the groove (27) in the body (5) of the gearbox drive and replaceable with another arcuate member (25') having first and second end portions (31",31") radially spaced from each other about said first axis substantially the same as the first and second stop portions (29,29') of said groove (27) are radially spaced from each other about said first axis.

20. The antenna mount of claim 19 wherein the first and second stop portions (29,29') of said groove (27) and the first and second end portions (31",31'") of the another arcuate member (25') are respectively radially spaced from each other about said first axis substantially between 220 and 240 degrees.

21. The antenna mount of claim 20 wherein the first and second end portions (31,31') of the first mentioned arcuate member (25) are respectively radially spaced from each other about said first axis substantially between 150 and 170 degrees.

22. The antenna mount of claim 1 wherein said antenna is a dish antenna.

* * * * *